BEST AVAILABLE COPY

J. W. McDONOUGH.

4261 Folding Lounge. REISSUED FEB 14 1871

Witnesses
N. C. Gridley
A. H. Shirburne

Inventor
James W. McDonough
By Farwell & Co
Attys.

United States Patent Office.

JAMES W. McDONOUGH, OF CHICAGO, ILLINOIS.

Letters Patent No. 60,400, dated December 11, 1866; reissue No. 4,261, dated February 14, 1871.

IMPROVEMENT IN FOLDING-LOUNGES.

The Schedule referred to in these Letters Patent and making part of the same.

*To all whom it may concern:*

Be it known that I, JAMES W. McDONOUGH, of the city of Chicago, in the county of Cook and State of Illinois, have invented certain new and useful Improvements in Folding-Lounges; and I do hereby declare the following to be a full, clear, and exact description thereof, reference being had to the accompanying drawing making part of this specification, in which—

Similar letters of reference indicate corresponding parts of the several figures of the drawing.

Figure 1:
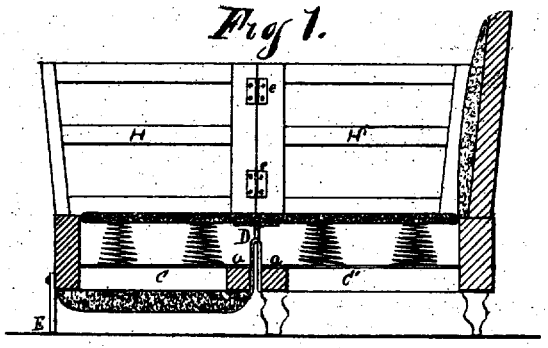
Figure 1 is a cross-section of the unfolded lounge.
Figure 2:
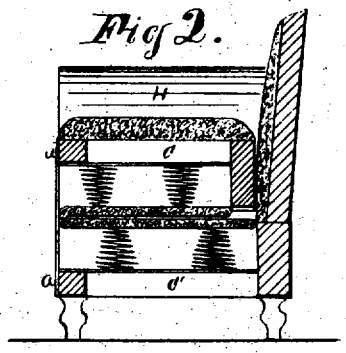
Figure 2 is a cross-section of the folded lounge.
Figure 3:
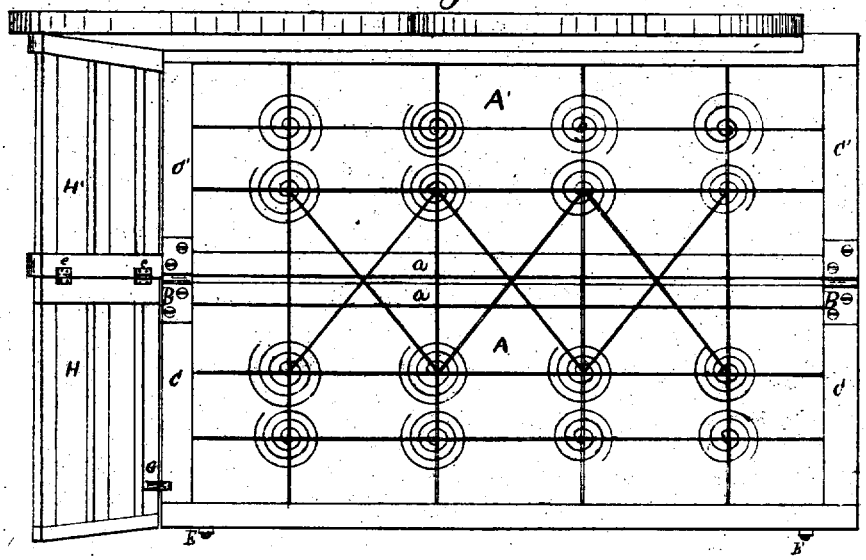
Figure 3 is a top view of the frames of the unfolded lounge.

The nature of my invention consists in the construction of the frames of a folding-lounge in such a manner as, when unfolded, to form an unobstructed space within the same, and within which, to place a spring-bed or mattress; and also in so constructing the head of a folding lounge that when unfolded the head extends across the entire width of the lounge.

The construction and operation of my said lounge is as follows:

The top of the center rails *a a* of the frames A A′ of the lounge, when the lounge is unfolded, does not come even or on a line with the top of the cross-rails C C′ of the frames A A′, as is generally the case in other lounges, but is placed lower and attached to and above the lower surface of said cross rails and on a line with each other, so as to form an unobstructed space within the said frames A A′, the entire width and length thereof; and within which said space and upon the top of said center rails *a a* of the frames A A′ can be placed a mattress or spring-bed; said frames A A′ being united together by the hinges B B at and to the inner ends of the cross-rails C C′. The space inside of said frames may be filled with hair or other suitable material, or with spiral springs resting upon a webbing, and in the frame A′, if desired, the springs may rest upon a board bottom with a light mattress of any suitable and desired construction, placed upon and over the springs, so as to make the operation of opening and folding light and easy.

When the lounge is folded the center rails *a a* of the frames A A′ leave an open space, D, between them.

Short legs E are attached to and at or near the end of the outer side of the frame A to support said frame when open, and so attached as to turn upon the side of said frame A at will, so that when said lounge is folded said legs E are hid between the back and the frame to which they are attached of said lounge.

The head of the lounge is made in two sections or parts, H and H′, section H′ being permanently attached to the frame A′, and section H being attached to section H′ by the hinges *e*, or other equivalent fastening, so that when the lounge proper is opened or unfolded the movable or folding section H of the head may be unfolded, and is supported in its proper and desired position by the rest or hook G, which is securely attached to the lower rail of section H of the head, thus forming a head across the entire width of the opened lounge.

Section H of the head, when open, extends upward to the top of the section H′, so that when closed such top of section H laps upon or rests against the top of section H′, forming a finish to the head proper when closed or folded together.

The lounge when unfolded, as described and shown, forms a perfect spring-bed or mattress-bed without having any hard ridge in its center where the frames are connected, and having a head across its entire width; and when folded it is supplied with double springs, when desired, its entire length.

I am aware that a folding-lounge proper has heretofore been made, and I do not claim such broadly; but What I do claim, and desire to secure by Letters Patent, is—

1. The rails *a a* of the frames A A′ of a folding-lounge, constructed substantially as and for the purpose described.

2. The frames A A′ of a folding-lounge, provided with the rails *a a*, in combination with the head H H′, substantially as described.

The above specification of my invention signed by me this 6th day of January, A. D. 1871.

Witnesses: JAMES W. McDONOUGH.

N. C. GRIDLEY,

N. H. SHERBURNE.